(12) United States Patent
Nishida et al.

(10) Patent No.: US 8,323,837 B2
(45) Date of Patent: *Dec. 4, 2012

(54) POROUS FILM

(75) Inventors: Yasunori Nishida, Tsukuba (JP); Yasuo Shinohara, Tsuchiura (JP); Hiroyuki Sato, Niihama (JP)

(73) Assignee: Sumitomo Chemical Company, Limited, Tokyo (JP)

(*) Notice: Subject to any disclaimer, the term of this patent is extended or adjusted under 35 U.S.C. 154(b) by 170 days.

This patent is subject to a terminal disclaimer.

(21) Appl. No.: 12/532,315

(22) PCT Filed: Mar. 19, 2008

(86) PCT No.: PCT/JP2008/055803
§ 371 (c)(1),
(2), (4) Date: Nov. 23, 2009

(87) PCT Pub. No.: WO2008/117840
PCT Pub. Date: Oct. 2, 2008

(65) Prior Publication Data
US 2010/0092754 A1  Apr. 15, 2010

(30) Foreign Application Priority Data
Mar. 23, 2007 (JP) ................. 2007-076416

(51) Int. Cl.
H01M 10/0583 (2010.01)
H01M 10/0587 (2010.01)
H01M 2/14 (2006.01)
H01M 2/16 (2006.01)
B32B 5/22 (2006.01)
C08J 9/00 (2006.01)

(52) U.S. Cl. ............ 429/251; 429/246; 428/317.9; 521/50; 521/94

(58) Field of Classification Search .......... 428/220, 428/317.9; 429/129; 521/50
See application file for complete search history.

(56) References Cited

U.S. PATENT DOCUMENTS

| | | | |
|---|---|---|---|
| 5,683,634 A | 11/1997 | Fujii et al. | |
| 5,691,047 A | 11/1997 | Kurauchi et al. | |
| 6,447,958 B1 | 9/2002 | Shinohara et al. | |
| 7,063,914 B2 * | 6/2006 | Kawano et al. | 429/508 |
| 2005/0221192 A1 | 10/2005 | Hennige et al. | |
| 2006/0216608 A1 * | 9/2006 | Ohata et al. | 429/246 |
| 2007/0196737 A1 | 8/2007 | Ohata et al. | |
| 2008/0038631 A1 * | 2/2008 | Nakura et al. | 429/144 |

FOREIGN PATENT DOCUMENTS

| | | |
|---|---|---|
| CN | 1795578 A | 6/2006 |
| EP | 1889867 A1 | 2/2008 |
| JP | 59-105035 A | 6/1984 |
| JP | 5-82171 A | 4/1993 |
| JP | 06-295719 A | 10/1994 |
| JP | 7-29563 A | 1/1995 |
| JP | 7-289864 A | 11/1995 |
| JP | 7-304110 A | 11/1995 |
| JP | 8-311233 A | 11/1996 |
| JP | 2000-30686 A | 1/2000 |
| JP | 2001-23602 A | 1/2001 |
| JP | 2001-206972 A | 7/2001 |
| JP | 2001-316006 A | 11/2001 |
| JP | 2001-342282 A | 12/2001 |
| JP | 2003-165863 A | 6/2003 |
| JP | 2003-318331 A | 11/2003 |
| JP | 2004-327183 A | 11/2004 |
| JP | 2005-294139 A | 10/2005 |
| JP | 2005-336367 A | 12/2005 |
| JP | 2006-066355 A | 3/2006 |
| JP | 2006-88426 A | 4/2006 |
| JP | 2006-307163 A | 11/2006 |
| JP | 2006-348280 A | 12/2006 |
| JP | 2007-95575 A | 4/2007 |
| WO | 2005/011043 A1 | 2/2005 |
| WO | WO 2006064775 A1 * | 6/2006 |

OTHER PUBLICATIONS

Material Safety Data Sheet for Poly(vinylidene) fluoride. Sigma Aldrich. 2011.*
U.S. Appl. No. 12/593,258, filed Sep. 25, 2009, to Kumamoto.
U.S. Appl. No. 12/528,565, filed Aug. 25, 2009, to Nishida et al.
U.S. Appl. No. 12/532,363, filed Nov. 24, 2009, to Nishida et al.
U.S. Appl. No. 12/600,227, filed Nov. 3, 2009 to Sato.
U.S. Appl. No. 12/600,176, filed Nov. 13, 2009 to Sato.
U.S. Appl. No. 12/600,200, filed Nov. 13, 2009 to Sato.
Chinese Office Action issued on May 2, 2012 in Chinese Patent Application No. 200880009376.1.
Japanese Office Action issued on Jul. 31, 2012 by the Japanese Patent Office in Japanese Patent Application No. 2008-062268.

* cited by examiner

Primary Examiner — Robert Sellers
Assistant Examiner — Kara Boyle
(74) Attorney, Agent, or Firm — Sughrue Mion, PLLC

(57) ABSTRACT

Provided is a porous film comprising a heat-resistant resin and two or more fillers, wherein a value of $D_2/D_1$ is 0.15 or less where among values each obtained by measuring the average particle diameter of particles that constitute one of the two or more fillers, the largest value is let be $D_1$ and the second largest value is let be $D_2$.

21 Claims, No Drawings

POROUS FILM

FIELD OF THE INVENTION

The present invention relates to a porous film, and more particularly to a porous film used for a non-aqueous electrolyte secondary battery, a capacitor, and the like.

BACKGROUND ART

A porous film is a film having micropores, and it is used as a separator in a non-aqueous electrolyte secondary battery such as a lithium ion secondary battery and a lithium polymer secondary battery, and a capacitor. It is required for a separator to have high heat-resistance for withstanding short-circuiting between a cathode and an anode as much as possible, and to have high ion permeability for increasing its electric capacity. As a separator achieving these properties, JP-A-2000-30686 discloses a separator comprising a nitrogen-containing aromatic polymer and a ceramic powder.

SUMMARY OF THE INVENTION

Although the separator as described above has high heat-resistance and high ion permeability, they may not be perfect as a separator in a non-aqueous electrolyte secondary battery which is required to have a high energy output at a high electric current, specifically, a non-aqueous electrolyte secondary battery for an automobile or a power tool of an electric tool.

An object of the present invention is to provide a porous film having high heat-resistance and high ion permeability, as well as providing a separator capable of further improving characteristics necessary for a separator used in a non-aqueous electrolyte secondary battery which is required to have a high energy output at a high electric current, namely, a high electric current discharge characteristic (rate characteristic).

In order to solve the above-mentioned problem, the present inventors have repeated intensive studies. As a result, they have reached to the present invention. That is, the present application provides the following inventions:

<1> A porous film comprising a heat-resistant resin and two or more fillers, wherein a value of $D_2/D_1$ is 0.15 or less where among values each obtained by measuring the average particle diameter of particles that constitute the two or more fillers, the largest value is let be $D_1$ and the second largest value is let be $D_2$.

<2> The porous film of <1> which has a thickness that is not less than 1 µm and not more than 50 µm.

<3> The porous film of <1> or <2>, wherein when the weight of all the fillers is let be 100, the weight of the filler that constituted of the particles having an average particle diameter of $D_1$ and the weight of the filler that is constituted of the particles having an average particle diameter of $D_2$ is 90 or more.

<4> The porous film of any one of <1> to <3>, wherein $D_1$ is not less than 0.1 µm, and $D_2$ is less than 0.1 µm.

<5> The porous film of any one of <1> to <4>, wherein $D_1$ is not more than 10 µm.

<6> The porous film of <4> or <5>, wherein $D_1$ is not less than 0.1 µm and not more than 1 µm, and $D_2$ is not less than 0.01 µm and less than 0.1 µm.

<7> The porous film of any one of <1> to <6>, wherein all the particles constituting the fillers are alumina particles.

<8> The porous film of any one of <1> to <7>, wherein part or all of the particles constituting the fillers are approximately spherical particles.

<9> The porous film of <7> or <8>, wherein when the overall weight of the porous film is let be 100, the weight of the fillers is not less than 20 and not more than 95.

<10> The porous film of any one of <1> to <9>, wherein the heat-resistant resin is a nitrogen-containing aromatic polymer.

<11> A separator made of the porous film of any one of <1> to <10>.

The present invention can provide a porous film having high heat-resistance and high ion permeability, as well as providing a separator capable of further improving characteristics necessary for a separator used in a non-aqueous electrolyte secondary battery which is required to have a high energy output at a high electric current, namely, a high electric current discharge characteristic (rate characteristic). The porous film of the present invention is preferably use as a separator for a non-aqueous electrolyte secondary battery and a capacitor, and therefore, the present invention is industrially very useful.

EMBODIMENTS OF THE INVENTION

The present invention provides a porous film comprising a heat-resistant resin and at least two fillers, wherein a value of $D_2/D_1$ is 0.15 or less in which $D_1$ is the largest average particle size and $D_2$ is the second largest average particle size among average particle sizes obtained by measuring an average size of particles constituting each of the fillers. In the present invention, because of such a structure of the porous film, relatively small micropores and relatively large micropores are formed in a balanced manner among the micropores in the film. The present inventors may assume that the structure of the micropores having a relatively small particle size may improve the heat-resistance of the porous film, while the structure of the micropores having a relatively large particle size may improve the ion permeability, and therefore, the rate characteristic of the film may be improved when the film is used in a non-aqueous electrolyte secondary battery.

In the present invention, the thickness of the film is preferably not less than 1 µm and not more than 50 µm, more preferably not less than 5 µm and not more than 30 µm, still more preferably not less than 5 µm and not more than 20 µm. When the thickness is relatively small, the ion permeability can be increased.

The micropores in the porous film of the present invention have a size (a diameter) of usually 3 µm or less, preferably 1 µm or less. The pore size can be controlled by suitably selecting average particle sizes and materials of the fillers used, and a filler content in the porous film. In the present invention, it is favorable that the relatively small micropores have a pore size of less than 0.1 µm, and the relatively small micropores have a pore size of not less than 0.1µ and not more than 1 µm. Also, in the present invention, the porous film usually has a porosity of usually 30 to 80% by volume, and preferably 40 to 70% by volume.

The present invention provides a porous film comprising a heat-resistant resin and at least two fillers, wherein a value of $D_2/D_1$ is 0.15 or less in which $D_1$ is the largest average particle size and $D_2$ is the second largest average particle size among average particle sizes obtained by measuring an average size of particles constituting each of the fillers. In the present invention, an average particle size is a value obtained by measuring the particle sizes in a scanning electron micrograph is used. That is, particles (filler particles) taken in a scanning electron micrograph of a surface or a cross section of a porous film are classified according to particle sizes, and when the largest average particle size is defined as $D_1$ and the second largest average particle size is defined as $D_2$ among the average particle sizes of the classes, a value of $D_2/D_1$ is 0.15 or less. In the present invention, the average particle size is obtained by arbitrarily selecting 25 particles in each class, measuring the particle size (diameter) of each particle, and averaging the particle sizes of the 25 particles. In the present invention, the particles constituting the fillers mean primary particles constituting the fillers.

When the porous film of the present invention is produced, a scanning electron micrograph of each of the two or more fillers to be used is taken, 25 particles are arbitrarily selected from the particles taken in the micrograph, particle sizes of the 25 particles are measured and averaged, and the averaged value is used as an average particle size. When the largest average particle size is defined as $D_1$ and the second largest average particle size is defined as $D_2$ among the average particle sizes of the fillers, a value of $D_2/D_1$ is 0.15 or less. That is, the present invention provides a porous film comprising a heat-resistant resin and at least two fillers, wherein a value of $D_2/D_1$ is 0.15 or less in which $D_1$ is the largest average particle size and $D_2$ is the second largest average particle size among the average particle sizes obtained by measuring an average size of particles constituting each of the fillers.

In the present invention, with respect to the filler consisting of the particles having the average particle size of $D_1$, the particle sizes of all of the particles are preferably within a range of 0.5 to 2 times $D_1$, more preferably within a range of 0.7 to 1.5 times $D_1$, still more preferably within a range of 0.8 to 1.2 times $D_1$. A narrower particle size distribution is better. With respect to the filler consisting of the particles having the average particle size of $D_2$, the particle sizes of all of the particles are preferably within a range of 0.5 to 2 times $D_2$, more preferably within a range of 0.7 to 1.5 times $D_2$, still more preferably within a range of 0.8 to 1.2 times $D_2$. A narrower particle size distribution is better. The effects of the present invention can be further improved by the above particle size distributions.

When the ratio of $D_2/D_1$ in the present invention is 0.10 or less, the effects of the present invention tend to be further improved. Also, in the present invention, the total weight of the filler consisting of the particles with the average particle size of $D_1$ and the filler consisting of the particles with the average particle size of $D_2$ are preferably at least 90, more preferably at least 95, and still more preferably at least 99, when the whole weight of all the fillers is let be 100. Accordingly, the effects of the present invention are further improved.

The weight of the filler consisting of the particles with the average particle size of $D_1$ is preferably at least 10, more preferably at least 30, when the whole weight of all the fillers is let be 100. Also, the weight of the filler consisting of the particles with the average particle size of $D_2$ is preferably at least 10, more preferably at least 30, when the whole weight of all the fillers is let be 100. More preferably, the ratio of the weight of the filler consisting of the particles with the average particle size of $D_1$ to the weight of the filler consisting of the particles with the average particle size of $D_2$ is from 30:70 to 70:30, when the whole weight of the fillers is let be 100.

In the present invention, $D_1$ is preferably 10 μm or less, from the viewpoint of increasing the electric capacity of a battery. Preferably, $D_1$ is not less than 0.1 μm and $D_2$ is less than 0.1 μm. More preferably, $D_1$ is not less than 0.1 μm and not more than 1 μm, and $D_2$ is not less than 0.01 μm and less than 0.1 μm. The effects of the present invention are further improved when $D_1$ and $D_2$ are set in these ranges.

In the present invention, examples of the heat-resistant resin include polyamides, polyimides, polyamideimides, polycarbonates, polyacetals, polysulfones, polyphenylene sulfides, polyether ether ketones, aromatic polyesters, polyether sulfones, and polyetherimides. In view of further improvement of the heat resistance, polyamides, polyimides, polyamideimides, polyether sulfones and polyetherimides are preferable, and polyamides, polyimides and polyamideimides are more preferable. Nitrogen-containing aromatic polymers such as aromatic polyamides (para-oriented aromatic polyamides and meta-oriented aromatic polyamides), aromatic polyimides and aromatic polyamideimides are still more preferable, and aromatic polyamides are especially preferable. In view of production easiness, para-oriented aromatic polyamides (hereinafter sometimes referred to as "para-aramids") are particularly preferable. In addition, the heat-resistant resin may also include poly-4-methylpentene-1, and cyclic olefin polymers.

In the present invention, the heat resistance can be improved, in other words, the temperature at which the film is thermally damaged, can be raised by the use of the heat-resistant resin as described above. The temperature at which the film is thermally damaged is usually 160° C. or more, though it depends on the kind of the heat-resistant resin. When the nitrogen-containing aromatic polymer as described above is used as the heat-resistant resin, the temperature at which the film is thermally damaged can be raised up to about 400° C. When poly-4-methylpentene-1 and the cyclic olefin polymer are used, the temperature at which the film is thermally damaged can be elevated up to about 250° C. and up to about 300° C., respectively.

The para-aramid is produced by condensation polymerization of a para-oriented aromatic diamine and a halide of a para-oriented aromatic dicarboxylic acid, and it substantially comprises repeating units in which amide bonds are bonded at the para-positions of the aromatic ring or at orientation positions analogous to the para-positions (for example, orientation positions extending along the same axis or in parallel in opposite directions, such as those found in 4,4'-biphenylene, 1,5-naphthalene, and 2,6-naphthalene). Specifically, the para-oriented para-aramids or para-aramids having the orientation analogous to the para-oriented para-aramids such as poly(para-phenylene terephthalamide), poly(para-benzamide), poly(4,4'-benzanilideterephthalamide), poly(para-phenylene-4,4'-biphenylene dicarboxylic acid amide), poly(para-phenylene-2,6-naphthalene dicarboxylic acid amide), poly(2-chloro-para-phenylene terephthalamide), and para-phenylene terephthalamide/2,6-dichloro-para-phenylene terephthalamide copolymers can be exemplified.

Among the aromatic polyimides described above, wholly aromatic polyimides produced by condensation polymerization of an aromatic acid dianhydride with a diamine are preferable. Specific examples of the aromatic acid dianhydride include pyromellitic dianhydride, 3,3',4,4'-diphenylsulfonetetracarboxylic dianhydride, 3,3',4,4'-benzophenonetetracarboxylic dianhydride, 2,2'-bis(3,4-dicarboxyphenyphexafluoropropane, and 3,3',4,4'-biphenyl tetracarboxylic dianhydride. Specific examples of the diamine include, but not limited to, oxydianiline, para-phenylenediamine, benzophenonediamine, 3,3'-methylenedianiline, 3,3'-diaminobenzophenone, 3,3'-diaminodiphenylsulfone, and 1,5'-naphthalene diamine. In the present invention, solvent-soluble polyimides are preferably used. Examples of the polyimides include polycondensate polyimides of 3,3',4,4'-diphenylsulfonetetracarboxylic dianhydride with an aromatic diamine.

Examples of the aromatic polyamideimides include products prepared by condensation polymerization using an aromatic dicarboxylic acid with an aromatic diisocyanate, and products prepared by condensation polymerization of an aromatic acid dianhydride with an aromatic diisocyanate. Specific examples of the aromatic dicarboxylic acid include isophthalic acid and terephthalic acid. Specific examples of the aromatic acid dianhydride include trimellitic anhydride. Specific examples of the aromatic diisocyanate include 4,4'-diphenylmethanediisocyanate, 2,4-tolylenediisocyanate, 2,6-tolylenediisocyanate, ortho-tolylenediisocyanate, and m-xylenediisocyanate.

Hereinafter, the filler used in the present invention will be explained. In the present invention, any material selected from organic powders, inorganic powders and mixtures thereof may be used for the filler.

Examples of the organic powder described above include powders made of organic substances, for example, homopolymers of styrene, vinyl ketone, acrylonitrile, methyl methacrylate, ethyl methacrylate, glycidyl methacrylate, glycidyl acrylate or methyl acrylate, or copolymers of two or more monomers; fluororesins such as polytetrafluoroethylene, tetrafluoroethylene-hexafluoropropylene copolymers, tetrafluoroethylene-ethylene copolymers and polyvinylidene fluoride; melamine resins; urea resins; polyolefins; and polymethacrylates. The organic powder may be used alone or as a mixture of two or more of them. Among these organic powders, the polytetrafluoroethylene powder is preferable because of the chemical stability thereof.

Examples of the inorganic powder as described above include powders made of inorganic substances, for example, metal oxides, metal nitrides, metal carbides, metal hydroxides, carbonates, and sulfates, and specifically includes particles made of alumina, silica, titanium dioxide, or calcium carbonate. The inorganic powder may be used alone or as a mixture of two or more of them. Among these inorganic powders, the alumina powder is preferable because of the chemical stability thereof. Herein, preferably, all particles constituting the fillers are alumina particles. More preferably, all particles constituting the fillers are alumina particles, and a part or all of the particles are substantially spherical alumina particles. In the present invention, the substantially spherical alumina particles encompass completely spherical particles.

In the present invention, a filler content in the porous film depends on the materials of the fillers. Usually, the weight of the fillers is not less than 5 and not more than 95, when the whole weight of the porous film is let be 100. For example, when all of the particles constituting the fillers are alumina particles, the weight of the fillers is usually not less than 20 and not more than 95, when the whole weight of the porous film is let be 100, preferably not less than 30% by weight and not more than 90% by weight. These ranges can be suitably selected according to the specific gravities of the materials of the fillers.

The shape of the filler particles used in the present invention may include substantially spherical, plate, cylindrical, needle, whisker and fiber shapes, and particles with either shape may be used. The substantially spherical particles are preferable, because they easily form uniform pores. Particles having an aspect ratio (a ratio of major axis length to minor axis length) within a range of not less than 1 and not more than 1.5 are included in the substantially spherical particles. The aspect ratio of the particles can be determined by observing electron micrograph.

In the present invention, among the combinations of the resin and the fillers described above, a combination in which a para-oriented aromatic polyamide is used as the heat-resistant resin, and a filler consisting of particles with an average particle size of $D_1$ which is not less than 0.1 μm and not more than 1 μm, and a filler consisting of particles with an average particle size of $D_2$ which is not less than 0.01 μm and less than 0.1 μm are used as the fillers, with all of the fillers consisting of substantially spherical alumina particles is particularly preferable.

From the viewpoint of ion permeability, the porous film of the present invention preferably has a gas permeability of not less than 50 sec./100 cc and not more than 500 sec./100 cc, more preferably not less than 50 sec./100 cc and not more than 300 sec./100 cc, still more preferably not less than 50 sec./100 cc and not more than 200 sec./100 cc, when measured by a Gurley method.

The porous film of the present invention is particularly useful as a separator for a non-aqueous electrolyte secondary battery such as a lithium ion secondary battery and a lithium polymer secondary battery. In addition, it can be satisfactorily used as a separator for an aqueous electrolyte secondary battery, a non-aqueous electrolyte primary battery, or a capacitor.

Hereinafter, a method for producing the porous film of the present invention will be explained.

Examples of a method for producing a porous film include a method comprising coating a plate- or film-form substrate is coated with a coating liquid containing a heat-resistant resin and fillers to form a porous film, and the like. Specifically, a method comprising the following steps is exemplified:

(a) preparing a slurry coating liquid by dispersing fillers in a solution of 100 parts by weight of a heat-resistant resin in a polar organic solvent, in an amount of 1 to 1500 parts by weight per 100 parts of the heat-resistant resin, (b) coating a substrate with the coating liquid to form a coating film, and (c) precipitating the heat-resistant resin from the coating film by means of humidification, removal of the solvent, immersion in a solvent which does not dissolve the heat-resistant resin, etc. to form a porous film, optionally followed by drying the porous film and peeling it off from the substrate.

When the para-aramid is used as the heat-resistant resin in the polar organic solvent solution, a polar amide solvent and a polar urea solvent may be used as the polar organic solvent. Specific examples of these solvents include, but are not limited to, N,N-dimethyl formamide, N,N-dimethyl acetoamide, N-methyl-2-pyrrolidone (NMP), and tetramethylurea.

When the para-aramid is used as the heat-resistant resin, in order to improve the solubility of the para-aramid in a solvent, preferably an alkali metal chloride or an alkaline earth metal chloride is added to the reaction mixture during the polymerization of the para-aramid. Specific examples of the chlorides include, but are not limited to, lithium chloride and calcium chloride. The amount of the chloride added to the polymerization system is preferably within a range of not less than 0.5 mole and not more than 6.0 moles, more preferably within a range of not less than 1.0 mole and not more than 4.0 moles, per mole of amide groups formed in the course of the condensation polymerization. When the amount of the chloride is less than 0.5 mole, the resulting para-aramid may have insufficient solubility. The amount exceeding 6.0 moles may be undesirable, because the amount substantially exceeds the amount of the chloride soluble in the solvent. In general, when the amount of the alkali metal chloride or the alkaline earth metal chloride is less than 2% by weight, the para-aramid may have insufficient solubility. When it exceeds 10% by weight, the alkali metal chloride or the alkaline earth metal chloride may hardly be dissolved in the polar organic solvent such as the polar amide solvent or the polar urea solvent.

When the aromatic polyimide is used as the heat-resistant resin, dimethylsulfoxide, cresol and o-chlorophenol are preferably used as a polar organic solvent dissolving the aromatic polyimide, besides those listed as the solvent dissolving the aramid.

As the method for preparing a slurry coating liquid by dispersing the filler, a pressure type disperser such as a Gorlin homogenizer or a nanomizer may be used.

Examples of the method for applying the slurry coating liquid include knife coating, blade coating, bar coating, gravure coating and die coating. The bar or knife coating is simple and easy, while the die coating is industrially preferable because an apparatus for die coating has such a structure that the solution is not exposed to an air. The coating step may be repeated twice or more. In this case, the coating step is generally carried out after the porous film is formed in the step (c).

The substrate material may be glass, thermoplastic resins, and the like. When the substrate is a porous film made from a thermoplastic resin, the peeling off step is not necessary in the step (c). In this case, the laminated porous film in which the porous film of the present invention and other porous film made from the thermoplastic resin are laminated is obtained. Such a laminate film is also very useful as a separator for a non-aqueous electrolyte secondary battery such as a lithium ion secondary battery and a lithium polymer secondary battery, and it can be satisfactorily used as a separator for an aqueous electrolyte secondary battery, a non-aqueous electrolyte primary battery, and a capacitor.

Hereinafter, a non-aqueous electrolyte secondary battery comprising the porous film of the present invention as a separator is described using a lithium ion secondary battery as an example.

The lithium ion secondary battery may be produced by any known method. For example, a battery can be produced by laminating a cathode sheet comprising a cathode collector coated with an electrode mixture for a cathode, an anode sheet comprising an anode collector coated with an electrode mixture for an anode, and the porous film of the present invention as a separator and winding the laminate to give an electrode member, placing the electrode member in a container such as a battery can, and impregnating the electrode member in the container with an electrolytic solution prepared by dissolving an electrolyte in an organic solvent.

The electrode member has a cross section, which appears when the electrode member is cut along direction vertical to the axis of winding, in the shape of a circle, an oval, a rectangle, a rectangle the edges of which are chamfered, and the like. The battery can be of any shape such as a paper sheet, a coin, a cylinder or a box-shape.

As the cathode sheet, a sheet comprising a cathode collector coated with an electrode mixture for a cathode which comprises a cathode active material, a conductive agent and a binder is usually used. The electrode mixture for a cathode preferably comprises a material capable of doping or dedoping lithium ions as a cathode active material, a carbonaceous material as a conductive agent, and a thermoplastic resin as a binder.

Specific examples of the cathode active materials include metal composite oxides comprising at least one transition metal element selected from the group consisting of V, Mn, Fe, Co, Ni, Cr and Ti, and an alkali metal element such as Li or Na, preferably composite oxides having an $\alpha$-NaFeO$_2$ structure as a basic structure, more preferably composite oxides such as lithium cobaltate, lithium nickelate and a composite oxide wherein a part of nickel of lithium nickelate is replaced with other element such as Mn or Co, from the viewpoint of a high average discharge potential. Composite oxides having a spinel structure such as spinel lithium manganese as a basic structure may also be exemplified.

Examples of the binders include thermoplastic resins, specifically polyvinylidene fluoride, vinylidene fluoride copolymers, polytetrafluoroethylene, tetrafluoroethylene-hexafluoropropylene copolymers, tetrafluoroethylene-perfluoroalkyl vinyl ether copolymers, ethylene-tetrafluoroethylene copolymers, vinylidene fluoride-hexafluoropropylene-tetrafluoroethylene copolymers, thermoplastic polyimides, carboxymethyl cellulose, polyethylene, and polypropylene.

Examples of the conductive agents include carbonaceous materials, specifically natural graphite, artificial graphite, cokes and carbon black. They may be used as a mixture of two or more of them.

Examples of the cathode collector include aluminum and stainless steel. Aluminum is preferable because of lightweight, low cost and easy processability.

Examples of a method for coating a cathode collector with an electrode mixture for a cathode include a pressure molding method, and a method comprising the steps of forming an electrode mixture for a cathode into a paste with a solvent or the like, coating a cathode collector with the paste, and drying the paste following by pressure bonding by pressing.

As the anode sheet, a sheet comprising a collector coated with an electrode mixture for an anode which comprises a material capable of doping or dedoping lithium ions may be used. Also, a lithium metal sheet and a lithium alloy sheet may be used. Specific examples of the materials capable of doping or dedoping lithium ions include carbonaceous materials such as natural graphite, artificial graphite, cokes, carbon black, pyrolytic carbons, carbon fibers, and baked organic polymer compounds. Also, a chalcogenide such as an oxide or a sulfide capable of doping or dedoping lithium ions at a potential lower than that of the cathode may be used. Among the carbonaceous materials, a carbonaceous material comprising graphite such as natural graphite or artificial graphite as a main component is preferable, because of good potential flatness and a low average discharge potential. The carbonaceous material is in the shape of any of a flake such as natural graphite, a sphere such as mesocarbon microbead, a fiber such as graphitized carbon fiber, an aggregate of a fine powder of these materials, and the like.

When an electrode mixture for an anode including polyethylene carbonate is used in a case where the electrolytic solution does not contain ethylene carbonate which is described later, the cycle characteristic and high current discharge characteristics of the obtained battery can be preferably improved.

The electrode mixture for an anode may optionally comprise a binder. Examples of the binders include thermoplastic resins, specifically polyvinylidene fluoride, polyvinylidene fluoride copolymers, vinylidene fluoride-hexafluoropropylene-tetrafluoroethylene copolymers, thermoplastic polyimides, carboxymethyl cellulose, polyethylene, and polypropylene.

The chalcogenide such as an oxide or a sulfide used as the material capable of doping or dedoping lithium ions contained in the electrode mixture for an anode include a crystalline or amorphous chalcogenide such as an oxide or a sulfide which comprises an element of Group 13, 14 or 15 of the Periodic Table, in particular, an amorphous chalcogenide comprising tin oxide. A carbonaceous material as a conductive agent and a thermoplastic resin as a binder may also be added thereto as necessary.

Examples of the anode collector used in the anode sheet include copper, nickel, and stainless steel. Copper is preferable, because it hardly forms an alloy with lithium, and it is easily formed into a thin film. Examples of a method for coating an anode collector with an electrode mixture for an anode include the same methods as those in the case of the cathode, that is, a pressure molding method, and a method comprising the steps of forming an electrode mixture for an anode into a paste with a solvent or the like, coating an anode collector with the paste, and drying the paste following by pressure bonding by pressing.

As the electrolytic solution, for example, an electrolytic solution comprising a lithium salt dissolved in an organic solvent may be used. Examples of the lithium salt include $LiClO_4$, $LiPF_6$, $LiAsF_6$, $LiSbF_6$, $LiBF_4$, $LiCF_3SO_3$, $LiN(SO_2CF_3)_2$, $LiC(SO_2CF_3)_3$, $Li_2B_{10}Cl_{10}$, a lithium salt of a lower aliphatic carboxylic acid, and $LiAlCl_4$. They may be used as a mixture of two or more of them. Among these lithium salts, it is preferable to use a mixture including at least one salt selected from the group consisting of $LiPF_6$, $LiAsF_6$, $LiSbF_6$, $LiBF_4$, $LiCF_3SO_3$, $LiN(SO_2CF_3)_2$ and $LiC(SO_2CF_3)_3$, all of which comprises fluorine atoms.

Examples of the organic solvent contained in the electrolytic solution include carbonates such as propylene carbonate, ethylene carbonate, dimethyl carbonate, diethyl carbonate, ethyl methyl carbonate, 4-trifluoromethyl-1,3-dioxolan-2-one, and 1,2-di(methoxycarbonyloxy)ethane; ethers such as 1,2-dimethoxyethane, 1,3-dimethoxypropane, pentafluoropropyl methyl ether, 2,2,3,3-tetrafluoropropyl difluoromethyl ether, tetrahydrofuran, and 2-methyltetrahydrofuran; esters such as methyl formate, methyl acetate, and γ-butyrolactone; nitriles such as acrylonitrile and butyronitrile; amides such as N,N-dimethyl formamide and N,N-dimethyl acetamide; carbamates such as 3-methyl-2-oxazolidone; sulfur-containing compounds such as sulpholane, dimethyl sulfoxide, and 1,3-propane sultone; above solvents to which a fluorine-containing substituent is introduced may be used. Usually, they are used as a mixture of two or more of them. Among them, a mixed solvent comprising a carbonate is preferable, and a mixed solvent of a cyclic carbonate and an acyclic carbonate and a mixed solvent of a cyclic carbonate and an ether are more preferable. Among the mixed solvents of the cyclic carbonate and the acyclic carbonate, a mixed solvent comprising ethylene carbonate, dimethyl carbonate or ethyl methyl carbonate is preferable, since they have a wide operating temperature range and good load characteristics, and they are hardly degraded even if the graphite material such as natural graphite or artificial graphite is used as the active material for an anode. It is preferable to use an electrolytic solution comprising a lithium salt having a fluorine atom such as UPI's, and an organic solvent having a fluorine-containing substituent, since a particularly excellent effect of improving safety can be obtained. A mixed solvent comprising dimethyl carbonate and an ether having a fluorine-containing substituent such as pentafluoropropyl methyl ether or 2,2,3,3-tetrafluoropropyl difluoromethyl ether is more preferable, because of its good high current discharge characteristics.

When a solid electrolyte is used instead of the abovementioned electrolytic solution, a lithium polymer secondary battery is obtained. As the solid electrolyte, for example, a polymer electrolyte such as a high molecular weight polyethylene oxide, a high molecular weight compound comprising at least one of a polyorganosiloxane chain and a polyoxyalkylene chain may be used. Also, a so-called gel-type electrolyte in which a nonaqueous electrolytic solution is impregnated in a polymer may be used. When a sulfide electrolyte such as $Li_2S$—$SiS_2$, $Li_2S$—$GeS_2$, $Li_2S$—$P_2S_5$ or $Li_2S$—$B_2S_3$, or an inorganic compound electrolyte comprising a sulfide such as $Li_2S$—$SiS_2$—$Li_3PO_4$ or $Li_2S$—$SiS_2$—$Li_2SO_4$ is used, the safety of a battery can be further improved.

Hereinafter, a capacitor comprising the porous film of the present invention as a separator will be illustrated. The capacitor can be produced by a conventional method such as a method disclosed in JP-A-2000-106327.

The capacitor may include an electric double layer capacitor. The capacitor comprises electrodes, a separator and an electrolytic solution, and the electrolyte dissolved in the electrolytic solution is absorbed by the electrodes, so that the electric energy is stored in an interface (an electric double layer) formed between the electrolyte and each electrode.

As the electrode for the capacitor, carbonaceous materials such as activated carbon carbon black, and polyacene may be used. In general, activated carbon having fine pores including mainly micropores (with a pore diameter of usually 20 Å or less), which is prepared by carbonizing a raw material such as coconut shell and activating it, is used. The whole pore volume of the activated carbon is usually less than 0.95 ml/g, preferably not less than 0.5 ml/g and not more than 0.93 ml/g. The whole pore volume of not less than 0.95 ml/g is preferable, because the electric capacity per unit volume increases. The activated carbon is usually pulverized to particles with an average particle size of 50 μm or less, preferably 30 μm or less, particularly 10 μm or less. The bulk density of the electrode can be increased and the internal resistance can be lowered by finely pulverizing the activated carbon.

Activated carbon containing few metal components such as alkali metals and alkaline earth metals, in other words, having a metal content of 100 ppm or less is preferably used as an electrode material, because such activated carbon induces no polarization due to the metal components, and it forms a number of electric double layers. Generally, the electrode further comprises a binder, a conductive agent, and the like, for easy formation of the electrode.

For producing an electrode, generally, a mixture containing activated carbon, a binder, a conductive agent, and the like is formed on a collector. Examples of a method for producing an electrode include a method comprising coating a collector with a mixed slurry prepared by adding a solvent to activated carbon, a binder, a conductive agent, and the like by a doctor blade method or the like, or immersing a collector in the mixed slurry, and drying the coated collector; a method comprising adding activated carbon, a binder, a conductive agent, and the like to a solvent, kneading the mixture, forming and drying the mixture to give a sheet, bonding the resulting sheet to the collector surface with a conductive adhesive or the like, and pressing a laminate of the sheet and the collector, followed by heat-treatment and drying; a method forming a mixture containing activated carbon, a binder, a conductive agent, a liquid lubricant, and the like on a collector, removing the liquid lubricant from the mixture, and then uniaxially or multi-axially stretching the resulting molded sheet; and so on. When the electrode is in the form of a sheet, its thickness is from about 50 to 1000 μm.

The material of a collector used in the electrode for the capacitor may include, for example, metals such as nickel, aluminum, titanium, copper, gold, silver, platinum, aluminum alloy, and stainless steel; a sheet formed by plasma spraying or arc spraying of nickel, aluminum, zinc, copper, tin, lead or alloys thereof on a carbonaceous material or an activated carbon fiber; conductive films comprising a conductive agent dispersed in a rubber or a resin such as a styrene-butylene-styrene copolymer (SEBS); and the like. Aluminum is particularly preferable, because it is lightweight, has excellent electric conductivity, and is electrochemically stable.

Examples of the conductive agent used in the electrode for the capacitor include conductive carbon such as graphite, carbon black, acetylene black, Ketchen black, and activated carbon different from one of the present invention; graphite conductive agents such as natural graphite, thermally expandable graphite, flaky graphite, and expandable graphite; carbon fibers such as vapor-grown carbon fiber; fine particles or fibers of a metal such as aluminum, nickel, copper, silver, gold, or platinum; conductive metal oxides such as ruthenium oxide or titanium oxide; and conductive polymers such as polyaniline, polypyrrole, polythiophene, polyacetylene, and polyacene. Carbon black, acetylene black and Ketchen black are particularly preferable, because the conductivity is effectively improved even if they are used in a small amount. The amount of the conductive agent contained in the electrode is usually from about 5 to 50 parts by weight, preferably from about 10 to 30 parts by weight, per 100 parts by weight of the activated carbon in the present invention.

The binder used in the electrode for the capacitor may be a polymer of a fluorine compound, and examples of the fluorine compound include fluorinated $C_1$-$C_{18}$-alkyl (meth)acrylates, perfluoroalkyl (meth)acrylates, perfluoroalkyl-substituted alkyl (meth)acrylates, perfluoroxyalkyl (meth)acrylates, fluorinated $C_1$-$C_{18}$-alkyl crotonate, fluorinated $C_1$-$C_{18}$-alkyl malates and fumarates, fluorinated $C_1$-$C_{18}$-alkyl itaconate, fluorinated alkyl-substituted olefins having about 2 to 10 carbon atoms and about 1 to 17 fluorine atoms, tetrafluoroethylene, trifluoroethylene, vinylidene fluoride, hexafluoropropylene, and the like. Apart from these compounds, addition polymers of monomers having an ethylenic double bond with no fluorine atom, polysaccharides such as starch, methyl cellulose, carboxymethyl cellulose, hydroxymethyl cellulose, hydroxyethyl cellulose, hydroxypropyl cellulose, carboxymethyl hydroxyethyl cellulose, nitrocellulose, and derivatives thereof; pheynol resins; melamine resins; polyurethane resins; urea resins; polyimide resins; polyamideimide resins; petroleum pitch; coal pitch; and the like. Among them, the polymers of a fluorine compound are preferable, and polytetrafluoroetylene, which is a polymer of tetrafluoroethylene, is particularly preferable as the binder. A plural kinds of the binders may be used as the binders. The amount of the binder used in the electrode is usually from about 0.5 to 30 parts by weight, preferably from about 2 to 30 parts by weight, per 100 parts by weight of the activated carbon.

The electrolytes dissolved in the electrolytic solution for the capacitor are roughly divided into inorganic electrolytes and organic electrolytes. Examples of the inorganic electrolyte include acids such as sulfuric acid, hydrochloric acid and perchloric acid; bases such as sodium hydroxide, potassium hydroxide, lithium hydroxide and tetraalkylammonium hydroxides; salts such as sodium chloride and sodium sulfate, and the like. Among them, an aqueous sulfuric acid solution is preferable as the inorganic electrolyte, because it has good stability and a low corrosive property against materials constituting the electric double layer capacitors. The concentration of the inorganic electrolyte is usually from about 0.2 to 5 moles of electrolyte per liter of an electrolytic solution, preferably from about 1 to 2 moles of electrolyte per liter of an electrolytic solution. When the concentration is from 0.2 to 5 moles/L, the ion conductivity in the electrolytic solution can be secured. The inorganic electrolyte is usually mixed with water and used in the form of an electrolytic solution.

Examples of the organic electrolyte include combinations of an inorganic anion such as $BO_3^{3-}$, $F^-$, $PF_6^-$, $BF_4^-$, $AsF_6^-$, $SbF_6^-$, $ClO_4^-$, $AlF_4^-$, $AlCl_4^-$, $TaF_6^-$, $NbF_6^-$, $SiF_6^{2-}$, $CN^-$ or $F(HF)_n^-$ wherein n is a number of not less than 1 and not more than 4, and an organic cation described below; combinations of an organic anion and an organic cation, which are described below; combinations of an organic anion and an inorganic cation such as lithium ion, sodium ion, potassium ion, or hydrogen ion. The organic cation is a cationic organic compound, and examples thereof include organic quaternary ammonium cation, organic quaternary phosphonium cation, and the like. The organic quaternary ammonium cation is a quaternary ammonium cation in which a hydrocarbon group selected from the group consisting of a $C_1$-$C_{20}$-alkyl group, a $C_6$-$C_{20}$-cycloalkyl group, a $C_6$-$C_{20}$-aryl group, and a $C_7$-$C_{20}$-aralkyl group is substituted with a nitrogen atom. The organic quaternary phosphonium cation is a quaternary phosphonium cation in which the same hydrocarbon group as above is substituted by a phosphor atom. To the hydrocarbon group, a hydroxyl group, an amino group, a nitro group, a cyano group, a carboxyl group, an ether group, an aldehyde group, or the like may be bonded. As the organic cation, the organic quaternary ammonium cation is preferable, and an imidazolium cation is preferable. 1-Ethyl-3-methyl imidazolium ($EMI^+$) is particularly preferable, because the electric capacity per unit volume tends to increase.

The organic anion is an anion having a hydrocarbon group which may have a substituent, and examples thereof include an anion selected from the group consisting of $N(SO_2R_f)_2^-$, $C(SO_2R_f)_3^-$, $R_fCOO^-$ and $R_fSO_3^-$ wherein $R_f$ is a perfluoroalkyl group having 1 to 12 carbon atoms; and an anion in which an active hydrogen atom is removed from an organic acid such as a carboxylic acid, an organic sulfonic acid and an organic phosphoric acid, or phenol. As the anions, the inorganic anions are preferable, and $BF_4^-$, $AsF_6^-$ and $SbF_6^-$ are particularly preferable, and $BF_4^-$ is particularly preferable, because the electric capacity tends to increase.

The organic polar solvent contained in the electrolytic solution is a solvent containing, as a main component, at least one compound selected from the group consisting of carbonates, lactones and sulfoxides, and preferably, a solvent containing, as a main component, at least one compound selected from the group consisting of propylene carbonate, ethylene carbonate, butylene carbonate, sulfolane, 3-methylsulfolane, acetonitrile, dimethyl carbonate, ethyl methyl carbonate, γ-butyrolactone, ethylene glycol and diethyl carbonate. A solvent containing, as a main component, at least one compound selected from the group consisting of ethylene carbonate, propylen carbonate, γ-butyrolactone and sulfolane is particularly preferable. Herein, the phrase "containing as a main component" is intended to mean that a specific the compound is contained in a solvent in an amount of at least 50% by weight, preferably at least 70% by weight. The larger amount of the organic polar solvent can more improves the long-time durability and the operating voltage of the capacitor. The organic polar solvent which dissolves the electrolyte may be a mixed solvent of two or more solvents.

Examples of a method for producing a capacitor using the electrodes and the electrolytic solution for the capacitor and the porous film of the present invention as the separator include a method comprising winding a pair of electrode sheets with inserting a separator between them to form an electrode member, immersing the electrode member in an electrolytic solution, and placing it in a closed-end cylindrical case; and a method comprising alternately laminating rectangle electrodes and rectangle separators to form an electrode member, immersing the electrode member in an electrolytic solution, and placing it in a closed-end square shape case.

Hereinafter, the present invention will be explained in more detail by the following Examples. The evaluations of a porous film, and the production and evaluations of a non-aqueous electrolyte secondary battery comprising the porous film as the separator were performed as follows:

Evaluations of Porous Film (1) Measurement of Thickness

The thickness of a porous film was measured in accordance with JIS K 7130-1992.

(2) Measurement of Gas Permeability by Gurley Method

The gas permeability of a separator was measured using a Gurley densometer with a digital timer manufactured by Yasuda Seiki Seisakusho Ltd. in accordance with JIS P 8117.

(3) Porosity

The porous film was cut into a square sample (10 cm×10 cm), and the weight W (g) and the thickness D (cm) of the sample were measured. The weight (Wi) of the material constituting the sample was calculated. Then, from Wi and the absolute specific gravity (g/cm$^3$) of the material constituting the sample, a porosity (% by volume) was calculated by the following equation:

Porosity (% by volume)=100×{1−($W1$/Absolute Specific Gravity 1+$W2$/Absolute Specific Gravity 2+ ... +$Wn$/Absolute Specific Gravity $n$)/(10×10× $D$)}

Production and Evaluation of Non-Aqueous Electrolyte Secondary Battery Having Porous Film as Separator (1) Production of Cathode Sheet Carboxymethylcellulose, polytetrafluoroethylene, acetylene black, and a lithium cobaltate powder as a cathode active material were dispersed in water and the mixture was kneaded to prepare a paste of an electrode mixture for a cathode. The weight ratio of the components contained in this paste, that is, the weight ratio of carboxymethylcellulose:polytetrafluoroethylene:acetylene black:lithium cobaltate powder:water was 0.75:4.55:2.7:92:45. The paste was applied to a cathode collector made of an aluminum foil having a thickness of 40 μm and the obtained product was dried and roll-pressed to obtain a cathode sheet.

(2) Production of Coin Cell

A cathode sheet, a separator made of a porous film, and a metal lithium foil as an anode were laminated in this order, the laminate was placed in a coin cell container and the impregnated with an electrolytic solution in which LiPF$_6$ was dissolved in an amount of 1 mol/liter in a mixed solvent of ethylene carbonate, dimethyl carbonate and ethyl methyl carbonate in a volume ratio of 16:10:74 as an electrolytic solution, and a lid was crimped to the opening edge of the cell container to obtain a coin cell. The above production of the coin cell was performed in a glove box replaced by argon.

(3) Evaluation of Charge-Discharge Performance of Coin Cell

Using the coin cell produced as described above, the charge and discharge test was carried out to evaluate the rate characteristic (high current discharge characteristic) of the cell.

<Evaluation of Rate Characteristic>

The battery was charged under charge conditions of a maximum charge voltage of 4.3 V, a charge time of 8 hours, and a charge current of 0.2 C, and discharged under discharge conditions of a minimum discharge voltage of 3.0 V, and a discharge current of 0.2 C or 2 C.

EXAMPLE 1

(1) Preparation of Coating Liquid

In 4200 g of NMP, 272.7 g of calcium chloride was dissolved, and then 132.9 g of para-phenylenediamine was added and completely dissolved therein. To the resulting solution, 243.3 g of terephthalic acid dichloride (hereinafter referred to as TPC) was gradually added to perform polymerization, whereby a para-aramid was obtained. The reaction mixture was diluted with NMP to obtain a para-aramid solution (A) having a concentration of 2.0% by weight. With 100 g of the obtained para-aramid solution, 2 g of alumina powder (a) (Alumina C manufactured by Nippon Aerosil Co., Ltd.; a number average particle size: 0.02 μm (corresponding to $D_2$); substantially spherical particles; aspect ratio of particles: 1) and 2 g of alumina powder (b) (Sumicorundum AA03 manufactured by Sumitomo Chemical Co., Ltd.; number average particle diameter: 0.3 μm (corresponding to $D_1$); substantially spherical particles; aspect ratio of particles: 1) were mixed in a total amount of 4 g as fillers, and the mixture was treated with a nanomizer three times, filtered through a 1000-mesh metallic mesh, and degassed under reduced pressure to prepare a slurry coating liquid (B). The amount of the alumina powders (fillers) was 67% by weight based on the total weight of the para-aramid and the alumina powders. $D_2/D_1$ was 0.07.

(2) Production and Evaluation of Separator

A 100 μm-thick PET film was coated with the slurry coating liquid (B) using a bar coater manufactured by Tester Sangyo Co., Ltd. The integral laminate of the coated layer of the coating liquid and the PET film was immersed in water as a poor solvent to deposit a para-aramid porous film, and then the solvent was removed. Thereafter, the para-aramid porous film was peeled from the PET film to obtain a porous film 1. The porous film 1 had a thickness of 25 μm. The porous film 1 had a gas permeability of 300 sec./100 cc and a porosity of 60%. It was found that the porous film 1 had micropores having a pore size of about 0.03 μm to 0.06 μm and micropores having a pore size of about 0.1 μm to 1 μm, when the cross section of the porous film 1 was observed with a scanning electron microscope (SEM).

(3) Evaluation of Non-Aqueous Electrolyte Secondary Battery

A coin sell was prepared using the porous film 1 in the above-mentioned manner, and its rate characteristic was evaluated. As a result, the ratio of the capacitance upon 2 C discharge to that upon 0.2 C discharge (2 C/0.2 C) was 70%.

COMPARATIVE EXAMPLE 1

A porous film 2 was produced in the same manner as in Example 1, except that 4 g of the alumina powder (a) (Alumina C manufactured by Nippon Aerosil Co., Ltd., an average particle size of 0.02 μm) was used alone. The porous film 2 had a thickness of 20 μm. The porous film 2 had a gas permeability of 500 sec/100 cc, and a porosity of 60%. It was found that pores having a pore size of about 0.03 μm to 0.06 μm were present on the surface of the heat-resistant layer in the porous film 2 when the surface was observed with a scanning electron microscope (SEM).

With the coin cell produced using the porous film 2 as described above, the rate characteristic was evaluated to find that the ratio of the capacitance upon 2 C discharge to that upon 0.2 C discharge (2 C/0.2 C) was 50%.

The invention claimed is:

1. A porous film comprising a heat-resistant resin which is a nitrogen-containing aromatic polymer and two or more fillers, wherein a value of $D_2/D_1$ is 0.15 or less where among values each obtained by measuring the average particle diameter of particles that constitute one of the two or more fillers, the largest value is $D_1$ and the second largest value is $D_2$, wherein when the total weight of the fillers is 100, a ratio of a weight of the filler consisting of the particles with the average particle size of $D_1$ to a weight of the filler consisting of the particles with the average particle size of $D_2$ is from 30:70 to 70:30 and wherein the nitrogen-containing aromatic polymer is selected from the group consisting of aromatic polyamides, aromatic polyimides, and aromatic polyamideimides.

2. The porous film according to claim 1 which has a thickness that is not less than 1 μm and not more than 50 μm.

3. The porous film according to claim 1, wherein when the weight of all the fillers is let be 100, the weight of the filler consisting of the particles having an average particle diameter of $D_1$ and the weight of the filler consisting of the particles having an average particle diameter of $D_2$ is 90 or more.

4. The porous film according to claim 1, wherein $D_1$ is not less than 0.1 μm, and $D_2$ is less than 0.1 μm.

5. The porous film according to claim 1, wherein $D_1$ is not more than 10 μm.

6. The porous film according to claim 4, wherein $D_1$ is not less than 0.1 μm and not more than 1 μm, and $D_2$ is not less than 0.01 μm and less than 0.1 μm.

7. The porous film according to claim 1, wherein all the particles constituting the fillers are alumina particles.

8. The porous film according to claim 1, wherein part or all of the particles constituting the fillers are approximately spherical particles.

9. The porous film according to claim 7, wherein when the overall weight of the porous film is let be 100, a weight of the fillers is not less than 20 and not more than 95.

10. A separator made of the porous film according to claim 1.

11. The porous film according to claim 7, wherein when the overall weight of the porous film is let be 100, a weight of the fillers is not less than 30 and not more than 90.

12. A porous film comprising a heat-resistant resin which is a nitrogen-containing aromatic polymer and two or more fillers, wherein a value of $D_2/D_1$ is 0.15 or less wherein among values each obtained by measuring the average particle diameter of particles that constitute one of the two or more fillers, the largest value is $D_1$ and the second largest value is $D_2$, wherein when the total weight of the fillers is 100, a ratio of a weight of the filler consisting of the particles with the average particle size of $D_1$ to a weight ratio of the filler consisting of the particles with the average particle size of $D_2$ is from 30:70 to 70:30, wherein the particles constituting the fillers are alumina particles.

13. The porous film according to claim 12 which has a thickness that is not less than 1 μm and not more than 50 μm.

14. The porous film according to claim 12, wherein when the weight of all the fillers is 100, the weight of the filler consisting of the particles having an average particle diameter of $D_1$ and the weight of the filler consisting of the particles having an average diameter of $D_2$ is 90 or more.

15. The porous film according to claim 12, wherein $D_1$ is not less than 0.1 μm and $D_2$ is less than 0.1 μm.

16. The porous film according to claim 12, wherein $D_1$ is not more than 10 μm.

17. The porous film according to claim 15, wherein D1 is not less than 0.1 μm and not more than 1 μm, and D2 is not less than 0.01 μm and less than 0.1 μm.

18. The porous film according to claim 12, wherein part or all of the particles constituting the fillers are approximately spherical particles.

19. The porous film according to claim 12, wherein when the overall weight of the porous film is 100, a weight of the fillers is not less than 20 and not more than 95.

20. A separator made of the porous film according to claim 12.

21. The porous film according to claim 12, wherein when the overall weight of the porous film is 100, a weight of the fillers is not less than 30 and not more than 90.

* * * * *